United States Patent
Grossglauser et al.

(10) Patent No.: US 6,353,596 B1
(45) Date of Patent: Mar. 5, 2002

(54) SYSTEM AND METHOD FOR MULTIPOINT-TO-MULTIPOINT MULTICASTING

(75) Inventors: Matthias Grossglauser, Balsthal (CH); Kadangode K. Ramakrishnan, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/631,869

(22) Filed: Apr. 12, 1996

(51) Int. Cl.⁷ ............................................... H04L 12/56
(52) U.S. Cl. ...................... 370/256; 370/390; 370/409
(58) Field of Search ................................ 340/256, 260, 340/390, 408, 409

(56) References Cited

U.S. PATENT DOCUMENTS

| | | | | |
|---|---|---|---|---|
| 5,434,855 A | * | 7/1995 | Perlman et al. ............ | 370/60.1 |
| 5,541,927 A | * | 7/1996 | Kristol et al. .............. | 370/94.2 |
| 5,831,975 A | * | 11/1998 | Chen et al. ................. | 370/256 |
| 6,049,546 A | * | 4/2000 | Ramakrishnan ............ | 370/412 |

* cited by examiner

Primary Examiner—Melvin Marcelo (57) ABSTRACT

A system and method are provided for a scalable and efficient multipoint-to-multipoint multicast in packet and sub-packet based communications networks. The methodology of the invention incorporates an additional switching feature called cut-through forwarding, which enables the mapping of several incoming virtual channels into one or several outgoing virtual channels. The inventive methodology further provides a shared tree spanning all senders and receivers of the multicast group. Centrally initiated group setup as well as dynamic group membership changes are incorporated into the invention. An additional feature of the invention, designated "short-cutting", allows for the transmission of a packet to follow the shortest path along the shared tree. A methodology is also provided for achieving interoperability among switching nodes in a network which are capable of fully implementing the multipoint-to-multipoint multicast method of the invention and other switching nodes which lack that capability.

41 Claims, 4 Drawing Sheets

SYSTEM AND METHOD FOR MULTIPOINT-TO-MULTIPOINT MULTICASTING

FIELD OF THE INVENTION

This application is related to multicasting in communications networks and more particularly to an improved method for providing multipoint-to-multipoint multicasting in sub-packet switched communications networks.

BACKGROUND OF THE INVENTION

Point-to-point communication across a communications network among a single sender and a single receiver is well known and networking protocols for point-to-point communications services are well established. Increasingly, however, a communications arrangement needs to be established among multiple senders and/or multiple receivers constituting a group having some community of interest. Accordingly, the concept of a group multicast service has evolved for enabling multiple senders to communicate to multiple receivers. It is known in the art to provide a point to multipoint connection. However, there is no present methodology for efficiently providing a multicast service between multiple senders and multiple receivers.

Networking applications can benefit in terms of scalability, performance and design simplicity from a group multicast service, i.e., a service enabling multiple senders to communicate to multiple receivers. Examples of multicasting on a broad scale include human collaboration such as video-conferencing and shared workspaces. Additionally, many applications in Local Area Networks (LANs) have often taken multicasting for granted (e.g., for address resolution, resource discovery, etc.). Moreover, it is believed that the need for multicasting will become even more pressing with the wide-scale deployment of distributed systems (e.g., maintaining replicated databases).

A number of approaches have been suggested for implementation of a multipointto-multipoint multicasting service in a communications network. In the Internet Protocol (IP) environment, two noteworthy approaches are the Core Based Tree ("CBT") approach and the Protocol Independent Multicast ("PIM") approach. The basic idea of CBT [see, T. Ballardie, P. Francis, and J. Crowcroft, "Core Based Trees (CBT)" in *Proc. ACM SIGCOMM* 93, (San Francisco, Calif.), September 1993] is to have a single tree per group, rooted at a core router. This tree is shared between all the senders to the group. A multicast group is set up by first choosing one (or several) core routers, and making them known to potential receivers. Receivers can then join the multicast group by sending join messages towards the core. As soon as the join message either reaches the core or a router that is part of the requested group's tree, the new receiver is attached to the tree. Senders simply unicast packets to the core. The core then forwards packets to the receivers in the group by "multicasting" the packet on the tree.

Two problems are associated with CBT. First, the reliability of the entire group is tied to the reliability of the core. If the core fails, the entire group fails. Second, the price paid by having a single tree shared by all senders sending to this group are traffic concentration and possibly increased delays as compared to having multiple sender-based shortest path trees. Moreover, the core may be a bottleneck, which contributes to the delays as a result of queuing.

PIM [see, S. Deering, et al., "An Architecture for Wide-Area Multicast Routing", in *Proc. ACM SIGCOMM* '94, (London), August 1994] attempts to combine the advantages of CBT with those of sender-based shortest path trees. By default, a multicast group gets set up as a core-based tree. However, a receiver has the option to request getting packets from a given sender on the shortest path, rather than through the core-based tree. The receiver chooses the option so as to minimize the delay, which may be useful in real-time communication. Both CBT and PIM exploit point-to-multipoint capability already present in IP-based packet networks.

As sender-based trees require per-sender state both in the sender-based tree itself and the shared tree (negative-cache entries saying "do not forward packets from sender S out this interface"), a large number of senders can only be supported on the shared tree. Furthermore, the soft-state approach in PIM requires refreshing this state on a regular basis. This traffic also grows with the number of senders that are supported by sender-based trees. The operation of switching a sender from a shared to a sender-based tree is relatively costly and results in a transition period where loss can occur. Finally, joins of new receivers get more costly as the number of senders supported by sender-based trees increases (in the straightforward one-tree-per-sender case, a receiver has to join all of the trees of all of the interesting senders) because the new receiver has to learn of the existence of these senders, which happens by temporarily grafting them back onto the shared tree.

For networks based on the Asynchronous Transfer Mode (ATM) networking protocol, other multicasting approaches have been considered. At a base level, ATM multicasting may be implemented as a mesh of point-to-point virtual circuits—i.e., by establishing individual point-to-point communications paths among all combinations of senders and receivers in such a multicast group. It will be apparent that such an embodiment would be highly resource intensive because each sender/receiver communications path would have to be configured using a separate virtual circuit, likely resulting in performance degradation (including duplicate transmission over the network links) as well as cost penalties. Moreover, it is often the case that virtual circuits are a scarce commodity.

It is also known in the art to implement an ATM point-to-multipoint service, wherein a "tree" is established representing a communications path from a single sender to multiple receivers. In such a tree, the sender can be seen as the root of the tree and each receiver as a branch of the tree. In such a point-to-multipoint service, common communications packets intended for multiple receivers are replicated at the branching point(s), rather than at the root, thus avoiding the need for redundant transmissions to those branching points. However, in order for multiple senders to multicast to a set of receivers, the use of such a point-to-multipoint approach results in multiple trees, all trying to talk to the same set of receivers.

The above limitation on multiple senders multicasting to multiple receivers has been addressed by the use of multicast servers—i.e., the establishment of an infrastructure of point-to-multipoint connections along with a server to achieve multipoint-to-multipoint communication. Specifically a multicast server is established to which all the senders send on distinct point-to-point circuits. The server sequences the information and sends it out on a point-to-multipoint connection to the ultimate receivers. The members of the multicast group form a multicast "cluster" and establish a connection to the multicast server, which itself establishes a point-to-multipoint connection to the receivers.

This approach suffers from the parallel deficiencies of requiring the dedication of a server to each multipoint-tomultipoint connection, and, where sub-packet communications networks are involved, as with ATM, also requiring reassembly of incoming sub-packets at the multicast server, before queuing them to be forwarded on the single point-to-multipoint connection to the receivers. Such a dedicated server represents not only a critical failure point that can take down the entire multicast arrangement, but also introduces significant latency as each arriving packet must be reassembled before being forwarded to the receivers. Moreover, where one or more receivers are located at a branching point between a sender and the server, it is necessary for packets to be forwarded from that sender all the way to the server and then back to the receiver, thus introducing both latency and the overhead of multiple traversal of the same path for such packets.

SUMMARY OF THE INVENTION

A system and method for implementation of multipoint-to-multipoint multicasting service in packet-based communications networks, such networks being comprised of interconnected switching nodes and transmission links defining transmission paths therein, such system and method being provided by carrying out the following steps:

specifying a unique identifier for association with each of a set of senders and receivers comprising a given multicast group;

selecting at least one switching node in such a network to act as an anchor for signalling messages sent toward that anchor from senders/receivers comprising the given multicast group;

defining a distribution tree for the given multicast group, such distribution tree including the anchor and a set of signalling paths connecting that anchor with all senders/receivers identified by that unique identifier;

causing communications paths to be established among switching nodes and transmission links included in the distribution tree, for transmission of information between senders and receivers in the given multicast group; and where a switching node in the distribution tree includes parallel input paths, from multiple senders in the given multicast group, causing each such switching node to completely process an information segment of predefined size received from a first such input path prior to processing any portion of another information segment received from another such input path.

In a further embodiment of the invention, the system and method for implementation of multipoint-to-multipoint multicasting service carries out the further step of:

causing each switching node in a communications path in the tree to operate on an information packet from a sender transmitted toward the anchor, so as to cause a copy of such information packet to be provided directly to a receiver in the given multicast group served by a communications path connected in the tree hierarchy at or below the location of that switching node, whereby only information packets destined to receivers served by communications paths connected in the tree hierarchy at or beyond the anchor need be transmitted to and processed by the anchor.

DETAILED DESCRIPTION OF THE INVENTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 1 may be provided by a single shared processor. (Use of the term "processor" should not be construed to refer exclusively to hardware capable of executing software.)

I. Environment For Practice Of Invention

As is well known, networks are a principal means of exchanging or transferring information (e.g., data, voice, text, video, etc.) among communications devices (i.e., devices for inputting and or outputting information such as computer terminals, multimedia workstations, fax machines, printers, servers, telephones, videophones, etc.) connected to the network(s). A network typically comprises switching nodes connected to each other, and to communication devices, by links. Each link is characterized by a link capacity which will generally be specified as a bandwidth or, equivalently, a transmission rate. When information is to be exchanged between two communications nodes/devices, a path is established within the network connecting the nodes (hereafter called the origination and destination nodes) with which those devices are associated. Such a communications path, or channel, between a specified origin and destination may be comprised of a set of physical paths (i.e., serially connected links and their included nodes along with the origin and destination nodes) within the network.

Figure 1:
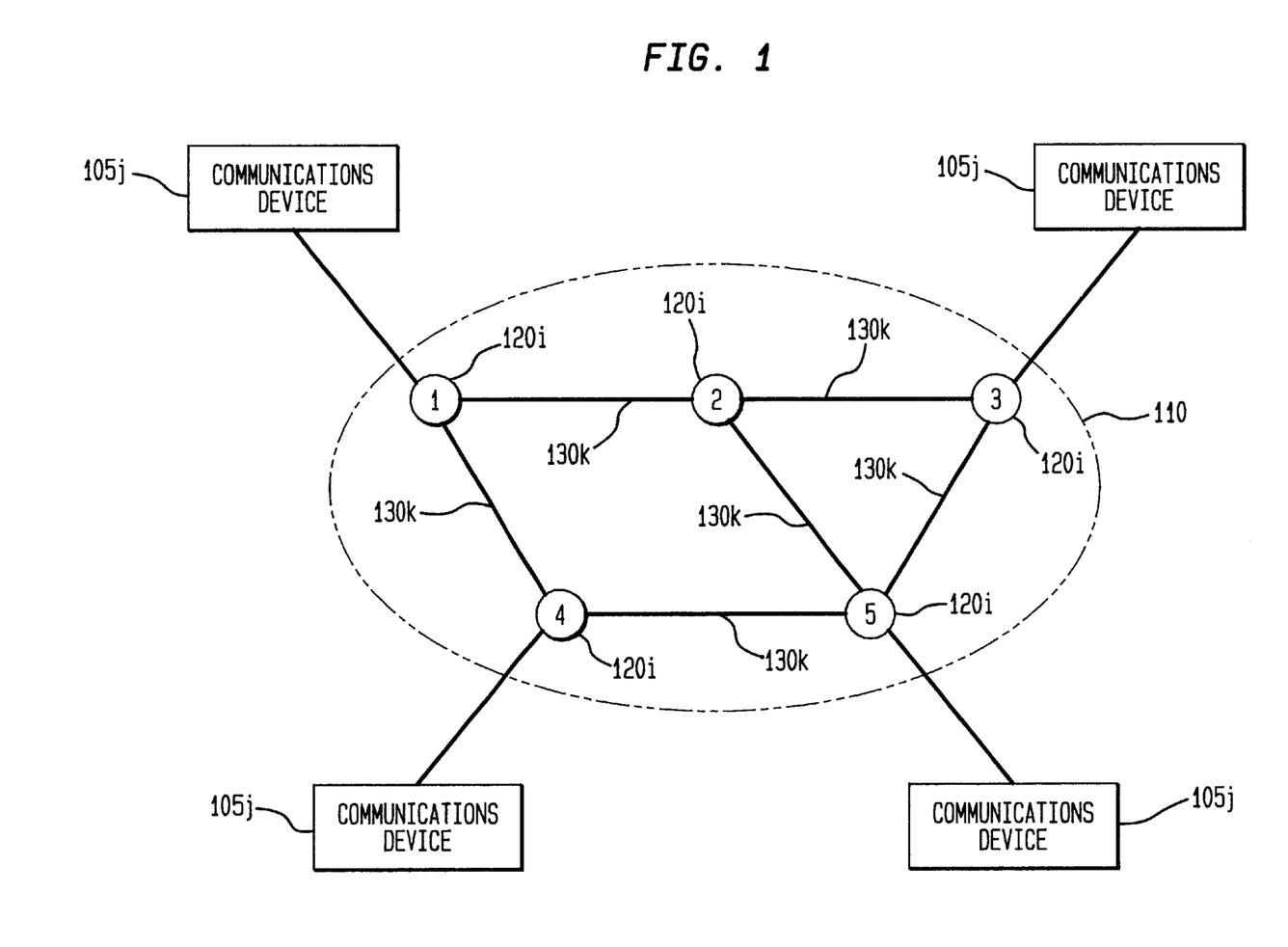
FIG. 1 depicts an exemplary network configuration for implementing the system of the invention.

FIG. 1 shows an exemplary wide area network illustrative of the configuration and operation of a contemporary communications network. Network 110 comprises a plurality of switching nodes 120-i and links 130-k. Each of the nodes 120-i may also have associated therewith a buffer of predetermined size and each of the links 130-k will have associated therewith a predetermined traffic handling capacity. Note that the depiction of a network comprising only five nodes is for convenience of illustration, and that an operating network may have a much larger number of nodes and the associated connecting links.

Various nodes are shown illustratively connected to Communications Devices 105-j. It should be understood that the single communications devices shown connected to the nodes in the figure are used for simplicity of illustration, and that an actual implementation of such a network would ordinarily have a number of communications devices connected at such nodes. Note, as well, that the illustrated communications devices may also represent another network, such as a LAN, which is connected to network 110.

Each communications device 105-j generates information for use by, or receives information from, other communications devices in the network. The term "information" as used herein is intended to include data, text, voice, video, etc. Information from communications device 105-j is characterized by a set of transmission and/or rate parameters related to network link and buffer requirements needed to accommodate transmission of such information.

In the design and operation of an information network, such as network 110, a concept that is frequently applied is that of a logical or virtual circuit or virtual connection between a sending and receiving communications device in the network. The basic idea of a virtual connection is that of a logical partitioning of a physical network into a number of virtual circuits generally serving different users and/or services. Such a virtual connection generally follows a single physical path (comprising a series of interconnected links between a sending and a receiving communications device) at any given time. It should be understood, however, that multiple virtual circuits may share capacity in a single physical path through a network.

Communications networks will often use a networking protocol called Asynchronous Transfer Mode (ATM). Indeed, it is generally believed that, within the next 5–10 years, most of the voice and data traffic generated throughout the world will be transmitted by ATM technology. Broadband packet networks based on Asynchronous Transfer Mode are enabling the integration of traffic with a wide range of characteristics within a single communication network. In these networks, all communication at the ATM layer is in terms of fixed-size packets, called "cells" in ATM terminology. An ATM cell consists of 48 bytes of payload and 5 bytes for the ATM-layer header. Routing of cells is accomplished through packet switches over Virtual Connections (hereafter "VCs") set up between endpoints. Packets of information may be broken up (or segmented) into multiple cells, each cell carrying the 48 bytes of information sequentially. The destination reassembles the cells received into the original packet. The assumption, at least for cells using the AAL5 adaptation layer protocol, is that all of the cells of a packet are delivered in order for a given VC, and hence can be assembled as they arrive in order.

II. Methodology Of Invention

A. Introduction

There are several applications that gain from an efficient multicasting infrastructure. This efficiency generally translates to allowing large scale group communication, where the complexity and overhead for communication does not grow unreasonably with the number of participants in the group.

Multicast "users" can be broadly divided into two general types: humans and machines. The human group has received more attention in the past, probably because the need for multicast is more obvious. Candidate applications for a multicast service include anything involving shared communication among more than two users, such as conference phone calls, videoconferencing, television (unidirectional or interactive), whiteboard, etc. This group of applications is rather well understood today, at least insofar as human users are known to have difficulty in focusing on multiple simultaneous input streams. Thus it appears unlikely that multicast groups involving human collaboration will arise with large numbers of simultaneous senders. However, for machine-oriented multicast applications, there is much reason to expect a large number of simultaneous senders, and the need for scalability in such multicast applications, as to both senders and receivers is substantial.

Machine-oriented multicast applications can usefully be characterized as comprising all applications where human users are not the immediate senders/sinks of the data being transmitted. Examples include name services, replicated databases, resource discovery, distribution services (such as financial data), and collection services (collect data from field sensors). Another example would be the emulation of LANs, where it is assumed that multipoint-to-multipoint communication is available. While this group of applications is still relatively immature, it is believed to represent a bigger challenge for a multicast service design. Overall, it can be expected that both the total network size and the size of potential multicast groups will grow substantially in the relatively near future, and that the variety of applications relying on multicast will become more diverse.

As noted in the Background section, a multicast service offers significant advantages over using a collection of point-to-point (unicast) links. The most obvious advantage is seen from the perspective of bandwidth usage: a packet sent to a number of receivers will traverse each link only once if multicast is used, because the packet is replicated only when the paths to the receivers diverge. However, to reach multiple receivers in the unicast case, multiple copies of the same packet can traverse the same link multiple times. Another advantage of multicast is the group abstraction that such a service can provide. Senders and receivers need not be aware of the identity or address of other members of the group. For them, the group exists as a single object that can be addressed as a single entity. The availability of such a service often simplifies the design and implementation of distributed systems, as membership information is decoupled from the application. For example, the application does not need to be informed about dynamic membership changes. A multicast service thus provides an essential glue to assemble distributed systems.

It is suggested that a multicast service addressed to the applications described above should encompass the following set of objectives:

Group management symmetry for senders and receivers;
Scalability as a function of the total network size, the group size, and the frequency of membership changes;
Distributed management, for example joins and leaves initiated by members (senders or receivers or both) that are invisible to other members—or, at least, which do not introduce an overhead on other members; and
smooth migration from current point-to-multipoint capabilities.

The methodology of the invention described hereafter provides a realization of such objectives.

B. Overview of Methodology

The invention disclosed herein is described in the context of a preferred embodiment represented by an implementation of the inventive methodology in an ATM network. It should be recognized, however, that concepts taught by the disclosure herein will be applicable to the provision of multicasting service in other communications networks, particularly other packet and sub-packet networks.

The development of ATM networks is fueled by the need for efficient utilization of wide-area network resources, scalable bandwidth and support for quality of service. The underlying mechanism is the use of Virtual Connections (VCs), where state for conversations in progress is maintained in the network's switches. The natural way VCs are set up is to associate state for a sender-receiver pair. While this is suitable for unicast (i.e., point-to-point) communication, it becomes state-intensive to use the same method for multicast service. Accordingly, a methodology is disclosed herein for providing a scalable and efficient multipoint-to-multipoint multicast service in sub-packet networks.

A defining property of the novel multipoint-to-multipoint multicast methodology disclosed herein is a shared tree between all senders and receivers of a group. The concept of a "core", as suggested by Ballardie, et al. [T. Ballardie, P. Francis, and J. Crowcroft, "Core Based Trees (CBT)" in *Proc. ACM SIGCOMM 93*, (San Francisco, Calif.), September 1993], is used as the root of the tree to be set up. Unlike the CBT core, however, which is a server through which all messages are funneled, the core for the invention acts primarily as an anchor for forwarding signalling messages, as explained more fully below. Thus with the methodology of the invention, every router/switch in the tree participates in the forwarding of traffic, including the router/switch which was chosen to be the core for signaling purposes.

Having a single shared tree per group has a number of important advantages. First, a group will allocate only one VC per link—i.e., a common VC serves all senders and receivers in the group. Relatedly, no per-sender state has to be maintained in switches. Intra-group consistency will also be more easily achieved: if all senders send on a common tree, then a receiver joining this tree is sure to receive from all the senders. Alternatively, if the group exists as a collection of sender-based trees, then it is not easy for the receiver to ensure that it has joined all of these trees.

Additionally, a single tree multicasting methodology permits several group members to be added in one step, initiated by the core. In a methodology involving per-sender trees, this is not so readily achieved: either each sender has to set up a tree to all the receivers, which means that the set of receivers has to be communicated to the senders, or the receivers join the sender tree for all the senders, which means that, in turn, the receivers need to know the set of senders. This can be an important performance consideration for applications that depend on rapid setup of centrally controlled groups.

It is known that a disadvantage of shared trees is the possibility of transmission delays that are higher than in the case of shortest-path sender-based trees [See, L. Wei and D. Estrin, "The Trade-Offs of Multicast Trees and Algorithms", in *Proc. Int'l Conference on Computer Communications and Networks*, (San Francisco), September 1994]. However, it should be also be noted that most networks exhibit a certain degree of hierarchy. Even in a local area network, where the network may be physically connected in an arbitrary mesh, the routing layer typically organizes the network in a hierarchical fashion. Given this hierarchy, it can be expected that sender-based trees will not offer significantly different delays than shared trees, because the hierarchical structure reduces the number of alternative paths from a sender to a receiver. For example, a campus network is usually connected to the Internet over a single leased line. This may be the most likely bottleneck in a wide-area multicast session. Both shared trees and sender-based trees would have to choose this link to reach all members on the campus.

The multicast methodology of the invention manages group members who are only senders, only receivers, or both, in the same way. All of these three types of members share one tree, rooted at the core. The tree's links are bi-directional channels. The core may be an ATM switch which provides the added role of being an anchor for signalling messages to be sent toward it, when senders/receivers are added. Segmentation-reassembly is not required at the core and only occurs in the end-systems that are senders and receivers.

This approach achieves the desired symmetry between senders and receivers—i.e., a large sender population is no more of a scalability concern than a large receiver population. Additionally, through the application of a unique additional switching feature (called "cut-through" and described more fully hereafter), a single VC can be used for the entire tree, thus conserving this potentially scarce resource. In a further embodiment of the invention, a novel signalling mechanism (termed "short-cutting" and more fully described hereafter), permits a beneficial modification to the way cells are forwarded in the switches: to wit, instead of packets first being sent to the core and then multicast back to the receivers, as in the MARS methodology described by Armitage [G. J. Armitage, "Multicast and Multiprotocol Support for ATM Based Internets," *ACM Sigcomm Computer Communications Review*, vol 25, April 1995], short-cuts can be taken at each switch on the tree. In other words, each packet spans the shared tree from its sender to all the receivers, keeping delays low.

Signalling for the multipoint-to-multipoint multicast methodology of the invention is based on a group handle. A handle is a unique conversation identifier for the inventive methodology. That handle is used in signalling messages to facilitate the association of appropriate input and output ports/VCs for the multicast group in the core and each of the switches/routers in the tree—i.e., the handle for a particular multicast group enables the mapping of input VCs for that group at a particular switch to the corresponding output VC(s) at that switch (in accordance with a routing table set up in each such switch). The handle consists of the core address plus an identifier. The core address is necessary because it allows members and intermediate switches to know the core through the group handle. Note that to make the handle globally unique, it is sufficient to make the additional identifier locally (at the core) unique.

C. Detailed Description of Methodology

For convenience of reference in the discussion following of the methodology of the invention, that inventive methodology will be designated by the acronym SEAM [*Scalable Efficient ATM Multicasting*]. It is also to be noted that additional background for the SEAM methodology is provided in an article prepared by the inventors entitled: "SEAM: Scalable and Efficient ATM Multipoint-to-Multipoint Multicasting", *In Preparation*.

(1) Cut-Through Switching

As described in the Overview section, a defining property of the SEAM methodology is the use of a shared tree between all senders and receivers. In the context of an ATM network, this translates further into a commonly designated VC serving all senders and all receivers in a group (as well as a single VC per link). In order for this shared tree multicasting methodology to work, it is necessary to be able to map multiple incoming VCs into one or several outgoing VCs at switches. While such mapping is straightforward at the packet level, a sub-packet network such as ATM introduces a substantial complication to such a mapping process.

In a preferred embodiment of the invention, it is assumed that the ATM cells are constructed in accordance with the AAL5 adaptation layer protocol, which is commonly applied for data transfer applications using ATM. With that AAL5 protocol, a packet is broken up into a number of ATM cells, where those cells are sequentially ordered and related to the underlying packet by the VC identifier and an "end of packet" marker. And, as explained above, the shared tree concept of the invention translates into a commonly designated VC serving all senders and all receivers in a group. This of course means that multiple links will carry this commonly designated VC, and at least in some instances two or more such links will be connected to input ports of a single switch. Now, since a particular packet is identified by its VC, the occurrence of a common VC at multiple input ports of a switch would result in chaos if the switch mapped from input to output ports in the straightforward manner. That is, if such mapping is done simply on a cell-by-cell basis (by VC identifier and in the order received), then cells belonging to different packets (and contemporaneously arriving at different input ports, but identified by the common VC) will interfere with each other—more particularly, such cells will be interleaved, resulting in corruption of the underlying packets.

As noted in the Background section, this problem has been addressed in the prior art by reassembling the packets, performing packet-level scheduling, and re-segmentation of one packet after the other into the out-bound point-to-multipoint VC (or mesh of point-to-point VCs). A multicast server is typically used to do this function of reassembly and forwarding. This approach makes for an obvious performance bottleneck and means that switches have to process packets. With the methodology of the invention, as discussed below, it is possible to achieve the same result without reassembly and segmentation.

With the AAL5 protocol, the constraint imposed by ATM is that the data on a particular VC is ordered. Given that ordering, and the fact that the ATM cell header contains an end-of-packet (EOP) designator, the cells comprising a packet may be determined from the VC identifier. When a cell containing the EOP flag is received, all the previous cells received on that VC are understood to belong to that packet.

With multiple senders transmitting to the same multicast group, however, these communications arrive on the same commonly-designated VC. Thus, it will be readily appreciated that when multiple senders send packets on the same VC, these packets need to be unambiguously ordered and forwarded so that there is no corruption of the data transmissions. As explained above, such unambiguous ordering and forwarding cannot be accomplished with a straightforward mapping of input VCs to output VCs. However, with the SEAM methodology such unambiguous ordering and forwarding is accomplished by having the switches perform a function designated as cut-through. Switches performing this cut-through function forward complete packets at a time, while buffering incoming packets from other input ports until the complete packet has been forwarded, as indicated by the forwarding of an EOP cell for the currently "being forwarded" packet.

Figure 2:
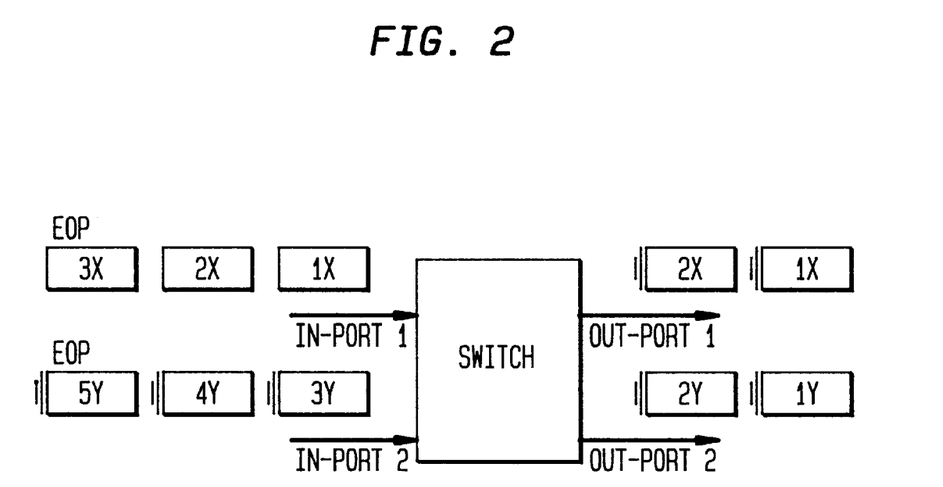
FIG. 2 provides a schematic depiction of the cut-through function for the methodology of the invention.

To illustrate the operation of this cut-through function, consider the case where two senders, A and B are transmitting data packets X and Y to a set of receivers, as depicted in FIG. 2. These data arrive at input ports 1 and 2, respectively, for the indicated switch, which is illustrative of one of the switches in the shared tree. If the networks were packet-based, rather than ATM, where packets were not being segmented into cells, the action of cut-through forwarding is simple: packet X would be transmitted and subsequently packet Y would be transmitted, both being identified by the handle H, which is the group handle. Whichever packet arrived first gets transmitted first.

With ATM networks, however, packets are segmented into cells and senders A and B transmit packets X and Y, with the same VC, which illustratively is designated as VC H. [Note that, while it is convenient for illustrative purposes to assume that all VCs are commonly designated by the group handle, "H", in practice each switch port is likely to have a different designation for the group VC, with the association of such different VC designations to the group handle being maintained in routing tables in the switches, based on signaling messages from, or in behalf of, each of the senders and/or receivers in the multicast group.] Packets X and Y are distinguished because of the fact that they arrive on different input ports of the switch, even though they arrive on the same logical VC.

Now, as previously noted, because the cell is the unit of transmission, rather than a packet, if the cells from packets X and Y, arriving at input ports 1 and 2, were forwarded without regard to packet association for the cells, it is likely that such forwarded cells will be interleaved. Thus it can be seen that forwarding cells in the order received, independent of which port at which they have arrived, on the same outbound VC is undesirable. To overcome this problem, the invention operates to effectively replicate the behavior of packet networks. That is, the cells comprising an entire packet, as received at an input port, are forwarded before any cells received on another input port may be forwarded. In this manner, the receivers do not have to distinguish cells of different packets arriving on the same VC (which would, in any event, be an impossible task).

This cut-through process of the invention is carried out by having the following actions carried out at the switch: the first cell of a packet arriving from any input port on VC H determines that this packet arriving on that input port gets unconditional priority to be forwarded on the outgoing VC H. Let this packet be Y from source B. Then, all of the cells of packet Y are forwarded first. Any other packet arriving on any other input port is queued at the switch for forwarding subsequent to the transmission of packet Y. For example, since, under the illustrative hypothesis, the first (and hence all) of the cells of packet X are received after the first cell of packet Y is sent, these are queued. When the last cell of packet Y (signified by the EOP cell, and designated 5Y in the figure) is transmitted, then the cells queued for packet X are transmitted from the switch on the spanning tree. From that point onwards, packet X gets priority for being transmitted on VC H until it has been completely forwarded by the switch. Although the cut-through function described herein has been illustrated in the context of a single switch, it should be understood that this function would be implemented for each switch in the shared tree.

Thus, it will be seen that the requirement on a switch in the shared tree performing "cut-through" is to identify the first cell of an incoming packet on a given multicast VC H, and to transmit cells received on that input port only, until the last cell of that packet has been transmitted. The cells from other input ports that arrive in the meanwhile on VC H are queued for forwarding subsequent to sending the last cell of the currently being forwarded packet.

In a further manifestation of the cut-through methodology, the switch may be arranged to consider the network transmission speed for packets being received at an input port. For example, it may be known that the transmission speed for packets received at a particular input port will be low—possibly because the port itself is slow, or possibly because the VC on that port has low bandwidth. In that case, forwarding priority may not be granted on the basis of the first input port to receive cells of a new packet. Rather, where such an input port (or the VC on that port) is characterized by a slow transmission speed, cells coming into that port may be buffered and the cells arriving at a higher-speed port forwarded (even though not first in time of arrival at the switch) while the full packet is received for the slower input port. This provides the obvious advantage of avoiding a delay in forwarding packets from higher speed ports due to the switch being tied up waiting for a low speed packet to be completely processed through the switch.

As a still further manifestation of the cut-through methodology, a time-out mechanism can be implemented for the case of the EOP cell of a packet being lost. As will be apparent, with the SEAM methodology, the loss of the EOP marker affects the forwarding of packets on other input ports. To overcome this problem, a time-out may be provided in the cut-through process, in respect to the waiting time for an additional cell on a VC at an input port. Upon timeout, the switch may regenerate a "dummy" EOP cell for the given VC, so that such dummy EOP cell can be forwarded, complete the packet, and thus allow other packets to now be forwarded from other input ports. As will be understood, such a time-out procedure is only needed when a packet is currently being cut through and the EOP cell has not yet been received at the input port.

(2) Creation of Multicast Group

When senders or receivers want to join a multicast group, a join message (i.e., a signalling message using the group handle) needs to be sent towards the core. To that end, the choice of a core needs to be made prior to setting up any part of the multicast tree. A question thus arises as to what entity has responsibility for setting up the core?

In one embodiment of the invention, an "initiator", who may or may not be a future member of the group, will be responsible for defining the core and disseminating the existence of the core to the potential members. This can happen, for example, through a name service, as proposed in Ballardie, et al., id., or through directly contacting the members, depending on the semantics of the group.

In an alternative embodiment, it does not need to be the initiator's responsibility to choose what switch in the network is elected as core. Such a selection can be made by the network itself, typically in the form of a core selection service. The initiator could provide information about expected group membership (e.g., geographical information) in order for the network to optimize the choice of a core. The network answers a core selection request with a handle that the initiator may use to advertise the group.

(3) Signalling for Member and Core Initiated Joins

It will be apparent that member-initiated joins are highly desirable for a scalable multicast service. The advantages of a member initiated join approach over a root initiated approach are twofold. First, the root (or core) of a multicast tree does not need to know about or keep track of the membership of the group. This results in a saving of processing resources and state space. Second, a join to a group that already has a tree set up can be terminated at the point where a new branch will be added to the existing tree. This translates into a saving of bandwidth (due to signalling messages travelling smaller distances, or hops), processing resources in the switches and reduced latency.

New members who wish to join the multicast group either as senders or receivers issue a join request. This join request travels towards the core on the shortest path, until it hits a switch that is already on the requested group's tree. A new branch is then created from that switch to the joining member. Essentially, the procedure is comparable to that of receivers joining a point-to-multipoint VC in the ATM User-Network Interface Signalling Specification, Version 4.0 [P. Samudra, "UNI Signalling 4.0 (draft)", *ATM Forum/* 95-1434R9, December 1995, but is generalized to both sending and receiving members. Options similar to those proposed in the December 1995 UNI 4.0 draft (i.e., without sender participation, with sender notification, with sender permission) can be used.

While member initiated joins are clearly necessary, it should be apparent that core initiated joins should be available as well. For example, if the initiator knows who the group members are going to be (e.g., because the application requires a well-defined set of members), then it would be much easier and more efficient for the initiator to be able to tell the core, upon setup, what hosts to connect to the group, instead of setting up the core, and then contacting each member individually and invite the member to join.

(3a) Use of a Receivers Downstream (RD) Bit

Figure 3A:
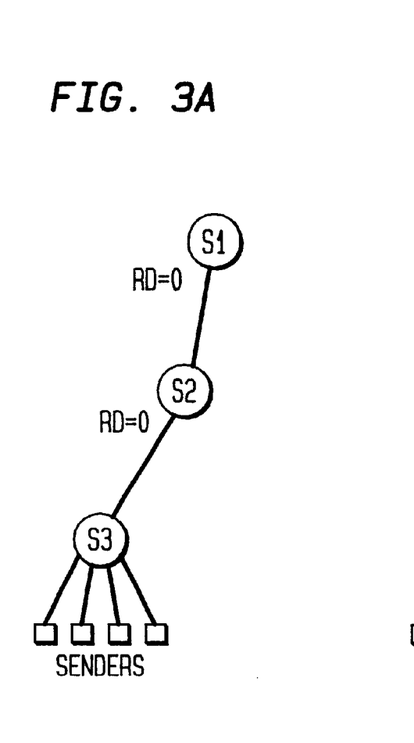
FIG. 3 depicts the operation of the "Receivers Downstream" element of the invention.

The use of a single shared tree among all receivers and senders requires the introduction of a small amount of per-link state to avoid wasting resources, such as transmitting to sender-only end-systems. In order to avoid forwarding packets to members who are only senders, a flag may be associated with the group at each "on-tree" switch. The flag, designated as the "Receivers Downstream" bit, indicates if there are any receivers downstream from this port. Consider the network configuration depicted in FIG. 3(*a*). The designation RD=0 at switch S1 means that this port only has senders downstream, and therefore no packets need to be forwarded on this port.

Figure 3B:
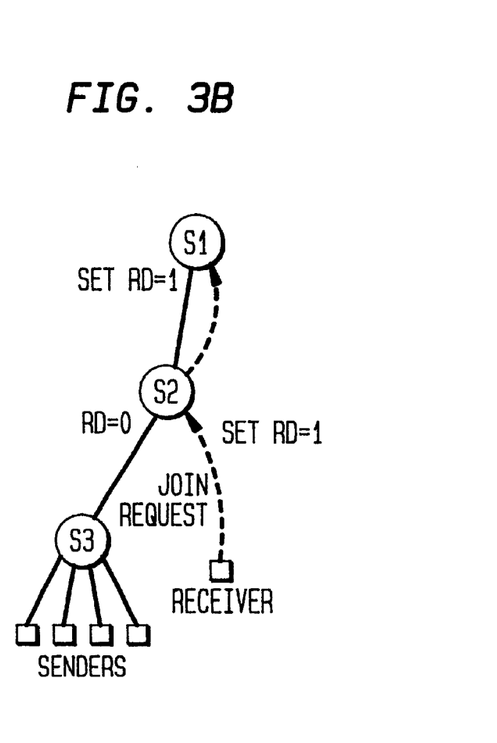

If a new receiver connects to the existing tree at a port that has the RD bit cleared, as indicated by the dashed connection at switch S2 in FIG. 3(*b*), then the forwarding tables in some upstream switches have to be updated, such that packets will be forwarded down to the new receiver. The join request therefore has to travel towards the core on the tree and update the forwarding table in each switch. The join request stops when it hits a switch with the RD bit set on at least one other port, which means that packets sent to the group already reach this switch. At each switch traversed on the tree, forwarding tables have to be updated such that packets will be forwarded towards the new receiver.

(4) Short Cutting

Figure 4:
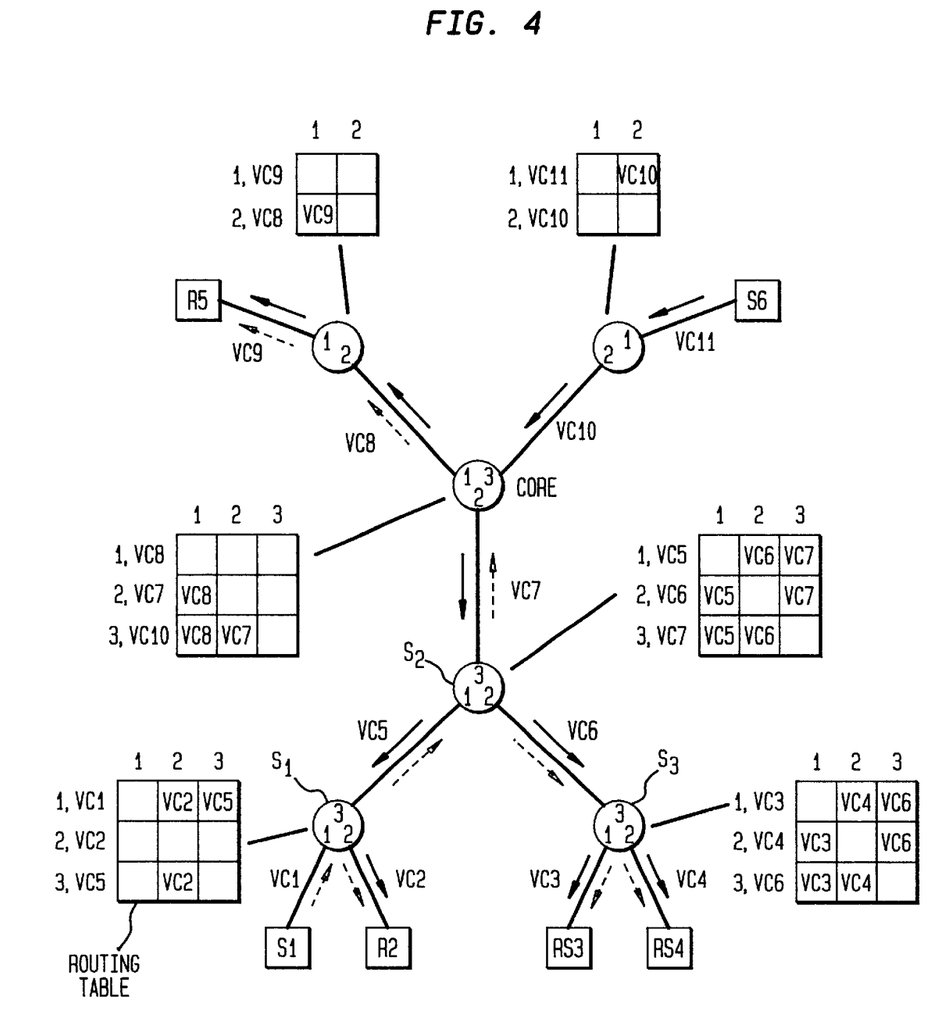
FIG. 4 provides an illustration of the operation of the short-cutting function of the invention.

In a further embodiment of the invention, an additional improvement in the efficiency of the SEAM multicasting methodology is realized by implementation of a process designated as short cutting. With the short cutting process, it is possible in many cases to avoid having the transmissions go to the core before being forwarded to the receivers. The operation of short cutting is illustrated in FIG. 4, which also provides a useful depiction of the way in which incoming VCs are mapped to outgoing VCs in accordance with routing table entries (which routing table entries have themselves been established on the basis of the handle for a given multicast group).

Consider switch $S_1$ in the figure, which is exemplary of the short cutting process, and particularly a message being sent from sender S1 to members of its multicast group. As can be seen, that message from sender S1 will arrive at port 1 of switch $S_1$ on VC1. In the exemplary routing table for switch $S_1$, which shows only entries corresponding to the multicast group of interest, input ports, and corresponding VCs for the multicast group are represented as rows of the table, with output ports being represented as columns. Entries in the table correspond to output ports and associated VCs to which messages arriving from a designated input port/VC should be forwarded. From the configuration in the figure, it can be seen that, in the absence of short cutting, the message from sender S1 would only be forwarded toward the core via output port 3 and VC5, corresponding to the table entry for input port 1/VC1, and thus, for that message to reach receiver R2, it would need to travel to the core via switch $S_2$, and then back to receiver R2 via switches $S_2$ and $S_1$.

With short cutting, however, an entry is placed in the routing table (for input port 1/VC1 and output port 2) showing that a receiver member of the multicast group (R1)

is joined to the group at that switch. Thus the message from sender S1 is caused to be forwarded directly to receiver R1 via output port 2/VC2, rather than having to be sent all the way to the core and back. Short cutting is also illustrated at switch $S_2$ with respect to a message from sender S1 for receiver/senders RS3 and RS4.

For the more general case of short cutting, anytime a cell is received at a switch S on a VC H, where context for VC H has been established at the switch (i.e., the switch knows it is in the spanning tree for conversation H), then the switch forwards the arriving cell on all the links of the spanning tree other than the one it was received on—subject to the constraint that, where the "Receivers Downstream" (RD) bit is used, forwarding will only occur on the links where the RD bit is set.

The switch also forwards the packet up to the core for forwarding to receivers on the "other side" of the core. The same principles will be applied as if the core is another receiver (i.e., the packet is not forwarded to the core on a link if it arrived from an input link that is on the shortest path to the core, following RPF rules).

With the short-cut process implemented, the core also has less work to do: it needs only to forward cells on the other spanning tree's links, not the link on which the cell was received. If, for example, there were only one outgoing link from the core for the spanning tree, and this was the link on which the cell was received, the core has no forwarding task to perform.

The core generally acts as any other SEAM switch. The one exception is that all data gets forwarded to the core, even if it does not have receivers on its other ports. In this case, the RD bit is not helpful since receiver joins only go as far as the core. There is no clean way to have the signalling progress beyond the core to the set of switches downstream—i.e., to the point where switches are reached that all have their RD bit set. Therefore, by requiring the data to be forwarded to the core, irrespective of the RD bit, switches in the tree are led to believe that there are always receivers downstream of the core.

Another gain for short-cutting is reduced latency, because packets between nearby sender-receiver pairs do not have to go through the core first. Finally, it should be understood that short-cutting is enabled by modifications in the signalling path of the switch implementation, and does not require any changes in the data path.

(5) Migration Methodology

It is believed that the cut-through capability contemplated by the SEAM methodology will be readily implemented in current and future generation ATM switches. However, many ATM networks will also include older generation switches which may not have the capability to implement that cut-through procedure. Accordingly, as a still further embodiment of the invention, a methodology is described herein for implementation of the SEAM methodology in a hybrid ATM network comprised of some ATM switches capable of effecting cut-through and some which lack that capability. In other words, an interoperability architecture is provided between non-SEAMable islands, (i.e., one or several switches not having the cut-through capability) and SEAM environments.

Figure 5:
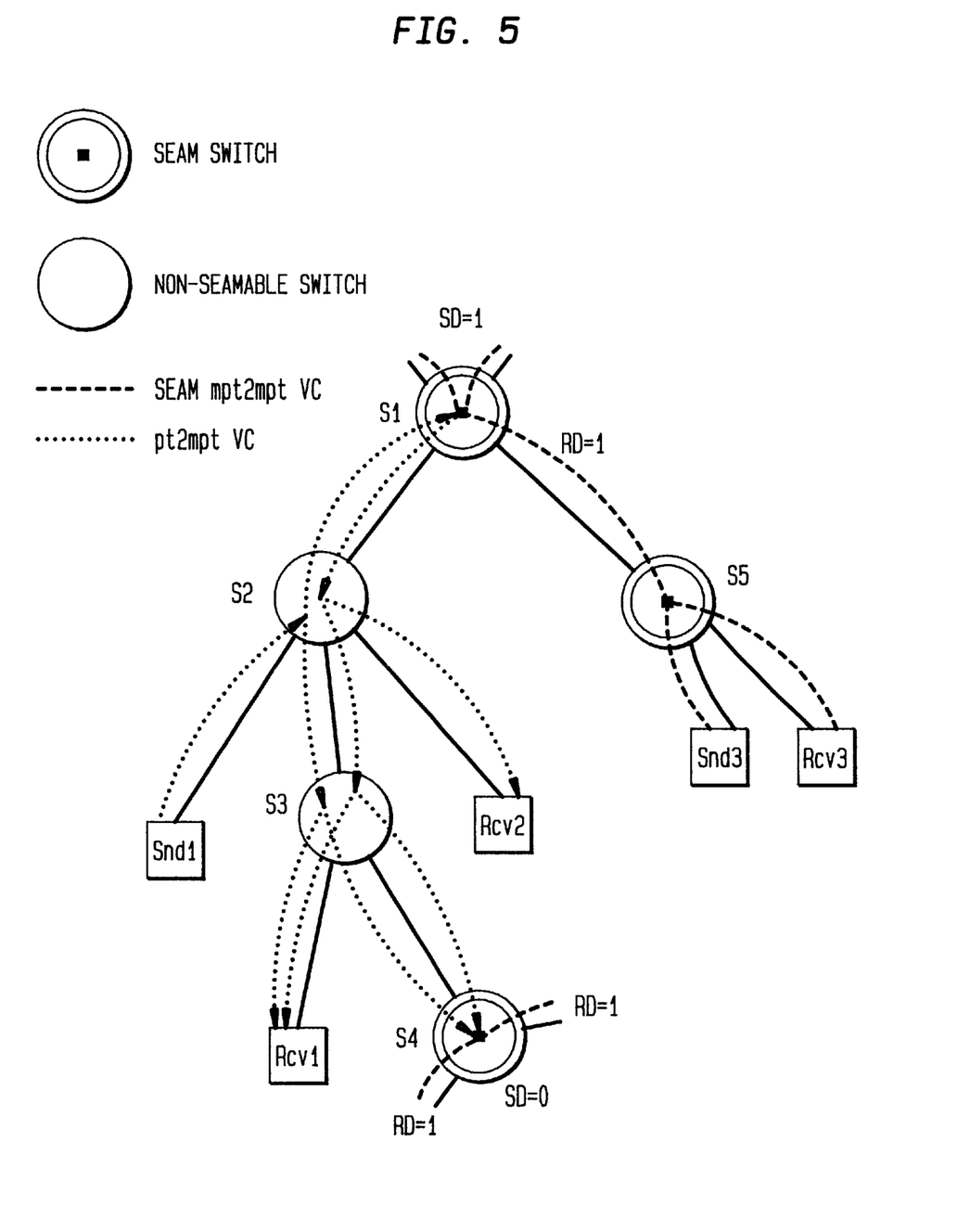
FIG. 5 illustrates an interoperability between network switches in which the methodology of the invention is implemented and other switches which are unable to carry out that methodology.

Consider the network configuration shown in FIG. 5. There, an island of two non-SEAMable switches, S2 and S3, is shown interconnected into a network with 3 SEAM switches, S1, S4 & S5. The interoperability issues which must be addressed are: (a) How may the SEAMable switches having a SEAM multipoint-to-multipoint VC belonging to the same group be connected to the island of non-SEAMable switches? (b) How may senders and receivers inside the non-SEAMable island be connected to the SEAM group? An assumption is made that the switches in the non-SEAMable island have the capability of setting up point-to-multipoint VCs, at least as specified in UNI 4.0.

To effect an efficient use of signalling resources, the concept of an SD-bit (sender-downstream) is introduced at each SEAMable switch. This bit is used to allow a SEAMable switch to set up connectivity to the non-SEAMable island for forwarding transmissions of the group from senders on the SEAM environment. The methodology for addressing these issues and for achieving the desired interoperability is as follows:

Each sender (Snd1) in the non-SEAMable island sets up a point-to-multipoint VC, rooted at itself, reaching all island receivers (Rcv1, Rcv2) as well as all border SEAM switches having the RD bit set on at least one port, other than the one connected to the island (e.g., at switches S1, S4).

Each border SEAM switch having the SD bit set (indicating a downstream sender on at least one other port than the one connected to the island), e.g., S1, sets up a point-to-multipoint VC to all the non-SEAMable island receivers (Rcv1, Rcv2) as well as the other bordering SEAM switches having the RD bit set on at least one other port than the one connected to the island (e.g., S4). The SD (Sender Downstream) bit, analogous to the RD bit, determines if there are senders on the other ports than the one connected to the island. If the SD-bit is not set, then the point-to-multipoint VC into the island rooted at that switch is not necessary. This avoids the signalling message making progress and a VC being set up unnecessarily. Note that it is enough to have an SD bit per switch, not per port.

Border SEAM switches (S1, S4) map all of the incoming point-to-multipoint VCs from the island into the SEAM multipoint-to-multipoint VC on the other ports. Reverse Path Forwarding is done per port (not per switch), i.e. an incoming VC from the non-SEAMable island is not forwarded into the point-to-multipoint VC back to the island.

Border SEAM switches map the point-to-multipoint VC into the island into the SEAM multipoint-to-multipoint VC as well.

This approach has the following properties. First, SEAM switches not connected to an island do not need to have any knowledge about the island (e.g., S5). Second, border SEAM switches (S1, S4) need to know about all of the non-SEAMable island senders (e.g., Snd1) (in order to do a leaf-initiated join to the point-to-multipoint VC rooted at these senders) as well as about other border SEAM switches (for the same purpose). The same holds for island receivers (Rcv1, Rcv2). Basically, inside the island, the situation is as if there were no SEAM multipoint-to-multipoint VCs. Border SEAM switches are, in the general case, both senders and receivers. Third, as short-cutting is "emulated" inside the island with multiple point-to-multipoint VCs, the same delay is realized as if there were only SEAM switches. Fourth, scalability in terms of sender population is obviously not achieved inside the island, as the number of point-to-multipoint VCs grows with the number of senders and bordering SEAM switches. However, the approach is scalable in the number of islands; each island is isolated in the sense that it does not need to know about other islands.

Conclusion

An efficient methodology for providing multipoint-to-multipoint communication in ATM networks has been described herein. The methodology of the invention allows for scaling up to a large number of potential senders and receivers. There is a single shared spanning tree for all senders and receivers. A unique handle is used, which enables switches in the spanning tree to translate to a single VC on a link, for identification of any packets associated with a given multicast group. That handle is a tuple (core address, unique-id at core) that is unique across the network. Each multicast group has an associated "core", which is used as the focal point for routing signalling messages for the group. However, at the data forwarding level (as opposed to signalling), the core essentially operates as just another switch in the spanning tree. Leaf-initiated joins to the single core-based tree are allowed by senders and receivers as well as core-initiated joins.

Two unique features are incorporated in the SEAM methodology: "cut-through" forwarding and "short-cutting" to achieve efficient multicasting with low-latencies for communication between senders and receivers. Cut-through forwarding in a switch enables the mapping of several incoming VCs into one or more outgoing VCs at a switch. A switch capable of cut-through forwards a multicast packet from one input port at a time, taking advantage of the an end-of-packet marker to identify when to "switch" to forwarding a new packet. Incoming packets from other input ports are buffered until it is their turn, thus ensuring packets are transmitted on an outgoing VC "atomically". "Short-cutting" is entirely in the signalling path in switches, and allows a packet to follow the shortest path along the shared tree spanning all senders and receivers of the group, thus avoiding a packet having to go all the way to the core and then be forwarded to the receivers. Finally, a means is provided for implementation of the methodology of the invention in a hybrid ATM network comprised of some ATM switches capable of effecting the method of the invention and some which lack that capability.

Although the present embodiment of the invention has been described in detail, it should be understood that various changes, alterations and substitutions can be made therein without departing from the spirit and scope of the invention as defined by the appended claims.

What is claimed is:

1. A cell transfer network which is made up of a plurality of nodes and transmission links interconnecting said nodes, including means for establishing at least one logical connection among a set of said nodes for effecting a transfer of a sequence of said cells from at least one sending node to at least one receiving node, said network including the improvement comprising:

means for responding to a specification of a multipoint-to-multipoint multicast group using said network by specifying a single spanning tree for said multicast group, said spanning tree comprising switching nodes and links in said network connecting sending and receiving nodes in said multicast group, at least one of said switching nodes in said spanning tree established as a core node for said tree;

means for responding to a request by any one of said sending nodes to send at least one sequence of said cells to receiving nodes in said multicast group via logical connections established in said spanning tree; and means for causing another switching node in said spanning tree to operate on a cell sequence from a sending node in said multicast group transmitted toward said core node so as to cause a copy of said cell sequence to be provided directly to a receiving node in a hierarchy of said spanning tree at or below a location in said hierarchy of said another switching node.

2. The improved cell transfer network of claim 1 wherein said means for establishing at least one logical connection operates to establish at most one logical connection per link of said spanning tree.

3. The improved cell transfer network of claim 1 wherein said means for establishing at least one logical connection operates to establish a common logical connection for all links in said spanning tree.

4. The improved cell transfer network of claim 1, claim 2 or claim 3, wherein a switching node in said spanning tree receives input cell sequences from a multiple of said sending nodes in said multicast group, further including means for causing said switching node to completely process a cell sequence received from a first input path prior to processing any portion of another cell sequence received from another of said multiple input paths.

5. The improved cell transfer network of claim 1, claim 2 or claim 3, further including means for causing at least one of said switching nodes in said spanning tree to maintain a marker at respective ports of said at least one switching node for each of said respective ports serving a receiving node of said multicast group downstream in said spanning tree from said respective port.

6. A method employed in a cell transfer network having a plurality of nodes and links to add an additional sending/receiving node to a set of nodes which belong to a multipoint-to-multipoint multicast group, the method having the steps of:

sending a message via a spanning tree in said network associated with said multicast group from said additional sending/receiving node toward a core node of said multicast group indicating that said additional node is to be added to said multicast group; and adding said additional node and any nodes traversed by said message which are not already in said spanning tree to said spanning tree.

7. The cell transfer network method of claim 6 including the additional step of causing at least one of said nodes traversed by said message to maintain a marker at respective ports of said at least one node for each of said respective ports serving a receiving node of said multicast group downstream in said spanning tree from said respective port.

8. The cell transfer network method of claim 7 including the further step of causing at least one of said nodes traversed by said message to operate on a sequence of said cells received at an input port of said at least one node from a sending node in said multicast group so as to cause a copy of said cell sequence to be transferred to an output port connected to a receiving node in said multicast group located downstream in said spanning tree.

9. A method for multipoint-to-multipoint routing of communications traffic among a plurality of information sources and information sinks connected to a communications network, said network being comprised of interconnected switching nodes and transmission links defining transmission paths in said network, wherein said communications network is arranged to transmit information within said network in the form of discrete units, said methodology comprising the steps of:

specifying a unique identifier for association with each of a set of said information sources and information sinks, said set of sources and sinks constituting a multicast group;

selecting at least one switching node in said network to act as an anchor for signalling messages sent toward said anchor from sources/sinks constituting said multicast group, said anchor and a set of paths for said signalling messages constituting a spanning tree for said multicast group;

providing communications paths in said spanning tree, for transmission of information among members of said multicast group; and where a switching node in said spanning tree includes multiple input paths, from a multiple of said sources in said multicast group, causing said switching node to completely process an information segment of predefined size received from a first input path prior to processing any portion of another information segment received from another of said multiple input paths.

10. The method for routing multipoint-to-multipoint communications traffic of claim 9 including an additional step of causing a switching node in said spanning tree to operate on an information unit from an information source in said multicast group transmitted toward said anchor, so as to cause a copy of said information unit to be provided directly to an information sink in a hierarchy of said spanning tree at or below a location in said hierarchy of said switching node.

11. The method for routing multipoint-to-multipoint communications traffic of claim 9 wherein said unique identifier includes an address for said anchor and at least one other identification parameter.

12. The method for routing multipoint-to-multipoint communications traffic of claim 9 wherein said communications paths in said spanning tree establish a shortest path within said network between each of said sources/sinks and said anchor.

13. The method for routing multipoint-to-multipoint communications traffic of claim 9 wherein said communications paths in said spanning tree establish a least-cost routing within said spanning tree.

14. The method for routing multipoint-to-multipoint communications traffic of claim 9, wherein a last portion of each said predefined segment is identified by an end-of-segment marker and said switching node operates to recognize said end-of-segment marker prior to accepting for processing information from another input path.

15. The method for routing multipoint-to-multipoint communications traffic of claim 9 wherein said communications paths in said spanning tree are constituted as not more than one logical connection per link.

16. The method for routing multipoint-to-multipoint communications traffic of claim 9 wherein all of said communications paths in said spanning tree are associated with a common logical connection.

17. The method for routing multipoint-to-multipoint communications traffic of claim 9 wherein said communications network operates in accordance with a networking protocol known as Asynchronous Transfer Mode ("ATM") and wherein said units for transmission of information within said network are established as cells, as defined by said ATM protocol.

18. The method for routing multipoint-to-multipoint communications traffic of claim 17 wherein said predefined information segment operated on by said step of causing each said switching node in said tree to completely process said predefined segment is constituted as a grouping of said ATM cells.

19. The method for routing multipoint-to-multipoint communications traffic of claim 18, wherein a last cell in each said grouping of ATM cells is identified by an end-of-segment marker and said switching node operates to recognize said end-of-segment marker prior to accepting for processing information from said another input path.

20. The method for routing multipoint-to-multipoint communications traffic of claim 19 wherein said grouping of ATM cells is constructed in accordance with an adaptation layer protocol designated as AAL5, and further wherein said end-of-segment marker is as defined by said AAL5 protocol.

21. The method for routing multipoint-to-multipoint communications traffic of claim 9 wherein membership of said information sources and said information sinks in said multicast group may be dynamically adjusted.

22. The method for routing multipoint-to-multipoint communications traffic of claim 21, wherein said dynamic membership changes occur in response to a request from a source/sink for a join to or leave from said membership.

23. The method for routing multipoint-to-multipoint communications traffic of claim 22 wherein said membership changes occur without notification of said change to said anchor.

24. The method for routing multipoint-to-multipoint communications traffic of claim 21, wherein said dynamic membership changes occur in response to a direction from said anchor.

25. The method for routing multipoint-to-multipoint communications traffic of claim 21, wherein said dynamic membership changes occur in response to a request from a third party.

26. The method for routing multipoint-to-multipoint communications traffic of claim 9 including the further step of causing at least one of said switching nodes in said spanning tree to maintain a marker at respective ports of said node for each of said respective ports serving an information sink of said multicast group downstream from said respective port.

27. The method for routing multipoint-to-multipoint communications traffic of claim 26 wherein said switching nodes operate to avoid transmitting information units to portions of said tree connected to ports not having said marker.

28. The method for routing multipoint-to-multipoint communications traffic of claim 9 wherein the step of causing each said switching node to completely process an information segment includes the substep of:

recognizing a port serving one of said multiple input paths having low transmission throughput;

causing information segments arriving at said low transmission throughput port to be buffered until a complete one of said information segments has been received at said port, regardless of when a first portion of said segment is received at said port relative to an arrival time for a segment portion at a port serving another of said multiple input paths.

29. The method for routing multipoint-to-multipoint communications traffic of claim 9 wherein the step of causing each said switching node to completely process an information segment includes the substep of:

establishing a waiting time threshold in respect to a time interval between receipt at an input port of a portion of an information segment and a next portion of said segment, said next portion being inclusive of said final portion having said end-of-segment marker; and where said time interval exceeds said threshold, causing said switching node to inject a "dummy" end-of-segment portion at said input port, thereby causing processing of said information segment to be completed by said switching node and processing of a new information segment to begin.

30. In a communications network comprised of interconnected switching nodes and transmission links defining transmission paths therein, wherein said communications network is arranged to transmit information within said network in the form of discrete units, an improvement in said network for enabling multipoint-to-multipoint multicast routing of communications traffic among a plurality of information sources and information sinks connected to said network, said improvement comprising:

means for causing a unique identifier to be associatiated with a set of information sources and information sinks comprising a multicast group;

means for selecting at least one switching node in said network to act as an anchor for signalling messages sent toward said anchor from said set of sources/sinks in said multicast group, said anchor and a set of paths for said signalling messages constituting a spanning tree for said multicast group;

means for providing communications paths in said spanning tree, for transmission of information among members of said multicast group; and where a switching node in said spanning tree includes multiple input paths, from a multiple of said sources in said multicast group, means for causing said switching node to completely process an information segment of predefined size received from a first input path prior to processing any portion of another information segment received from another of said multiple input paths.

31. The improved network for routing of multipoint-to-multipoint communications traffic of claim 30 further including means for causing a switching node in said spanning tree to operate on an information unit from an information source in said multicast group transmitted toward said anchor, so as to cause a copy of said information unit to be provided directly to an information sink in a hierarchy of said spanning tree at or below a location in said hierarchy of said switching node.

32. The improved network for routing of multipoint-to-multipoint communications traffic of claim 30 wherein said unique identifier includes an address for said anchor and at least one other identification parameter.

33. The improved network for routing of multipoint-to-multipoint communications traffic of claim 30, further including means for recognizing an end-of-segment marker included in a last portion of each said predefined segment, prior to accepting for processing information from said another input path.

34. The improved network for routing of multipoint-to-multipoint communications traffic of claim 30 wherein said communications network operates in accordance with a networking protocol known as Asynchronous Transfer Mode ("ATM") and wherein said units for transmission of information within said network are established as cells, as defined by said ATM protocol.

35. The improved network for routing of multipoint-to-multipoint communications traffic of claim 30 further including means for causing at least one of said switching nodes in said spanning tree to maintain a marker at respective ports of said node for each of said respective ports serving an information sink of said multicast group downstream from said respective port.

36. The improved network for routing of multipoint-to-multipoint communications traffic of claim 35 where said switching nodes operate to avoid transmitting information units to portions of said tree connected to ports not having said marker.

37. The improved network for routing of multipoint-to-multipoint communications traffic of claim 30 wherein said means for causing each said switching node to completely process an information segment further includes:

means for recognizing a port serving one of said multiple input paths having low transmission throughput; and means for causing information segments arriving at said low transmission throughput port to be buffered until a complete one of said information segments has been received at said port, regardless of when a first portion of said segment is received at said port relative to an arrival time for a segment portion at a port serving another of said multiple input paths.

38. The improved network for routing of multipoint-to-multipoint communications traffic of claim 33 wherein said means for causing each said switching node to completely process an information segment further includes:

a waiting time threshold in respect to a time interval between receipt at an input port of a portion of an information segment and a next portion of said segment, said next portion being inclusive of said final portion having said end-of-segment marker; and where said time interval exceeds said threshold, means for causing said switching node to inject a "dummy" end-of-segment portion at said input port, thereby causing processing of said information segment to be completed by said switching node and processing of a new information segment to begin.

39. In a communications system for carrying out the multipoint-to-multipoint routing methodology of claim 9 (hereafter, the "SEAM" methodology) among a defined multicast group of senders and receivers, wherein said communications system is operated across a communications network comprised of a plurality of switching nodes and interconnecting transmission links, and further wherein said plurality of switching nodes includes a first portion characterized as being operable to fully implement said SEAM methodology (hereafter, "SEAMable nodes") and a remaining portion being incapable of fully implementing said SEAM methodology (hereafter, "nonSEAMable nodes"), a method for effecting interoperability between said SEAMable nodes and said nonSEAMable nodes in carrying out said SEAM methodology across said network, said method comprising the steps of:

identifying nonSEAMable nodes in said network and designating each contiguous grouping of one or more of said nonSEAMable nodes as a nonSEAMable island;

identifying SEAMable nodes that directly interface nodes included in each said nonSEAMable island (hereafter designated as "border SEAMable nodes");

establishing, for each of said senders served by a nonSEAMable island node, a point-to-multipoint virtual connection reaching all of said receivers served by nodes in said nonSEAMable island and all border SEAMable nodes interfacing said nonSEAMable island;

establishing, for each of said border SEAMable nodes interfacing said nonSEAMable island, a point-to-multipoint virtual connection to all of said receivers served by nodes in said nonSEAMable island and all remaining of said border SEAMable nodes interfacing said nonSEAMable island;

causing each of said border SEAMable nodes to map all incoming point to multipoint virtual connections from said nonSEAMable island into a SEAM multipoint-to-multipoint virtual connection established for said multicast group on other ports of each said border SEAMable nodes; and causing each of said border SEAMable nodes to map all outgoing point to multipoint virtual connections to said nonSEAMable island into said SEAM multipoint-tomultipoint virtual connection established for said multicast group on other ports of each said border SEAMable nodes.

40. The method for effecting interoperability between SEAMable nodes and nonSEAMable nodes of claim 39 including the further steps of:

causing a first marker to be maintained at said border SEAMable nodes when at least one sender of said multicast group is served by a port of said border SEAMable node other than a port serving said nonSEAMable island;

causing a second marker to be maintained at respective ports of said border SEAMable nodes serving said multicast group for each of said respective ports having at least one receiver of said multicast group downstream from said respective port;

for said point-to-multipoint virtual connections established for said senders served by said nonSEAMable island nodes, eliminating any of said border SEAMable nodes interfacing said nonSEAMable island as destinations for said point-to-multipoint virtual connections where at least one port of said border SEAMable node other than a port interfacing said nonSEAMable island does not exhibit said second marker; and for said point-to-multipoint virtual connections established from said border SEAMable nodes to said nonSEAMable island, eliminating any of said border SEAMable nodes not exhibiting said first marker as roots for said point-to-multipoint connection.

41. The method for effecting interoperability between SEAMable nodes and nonSEAMable nodes of claim 40 including the further step of:

for respective ones of said border SEAMable nodes interfacing said nonSEAMable island serving as roots for said point-to-multipoint virtual connections, eliminating any of said remaining border SEAMable nodes as destinations for said point-to-multipoint virtual connections where at least one port for respective ones of said remaining border SEAMable nodes, other than a port interfacing said nonSEAMable island, does not exhibit said second marker.

\* \* \* \* \*